United States Patent Office 2,838,105
Patented June 10, 1958

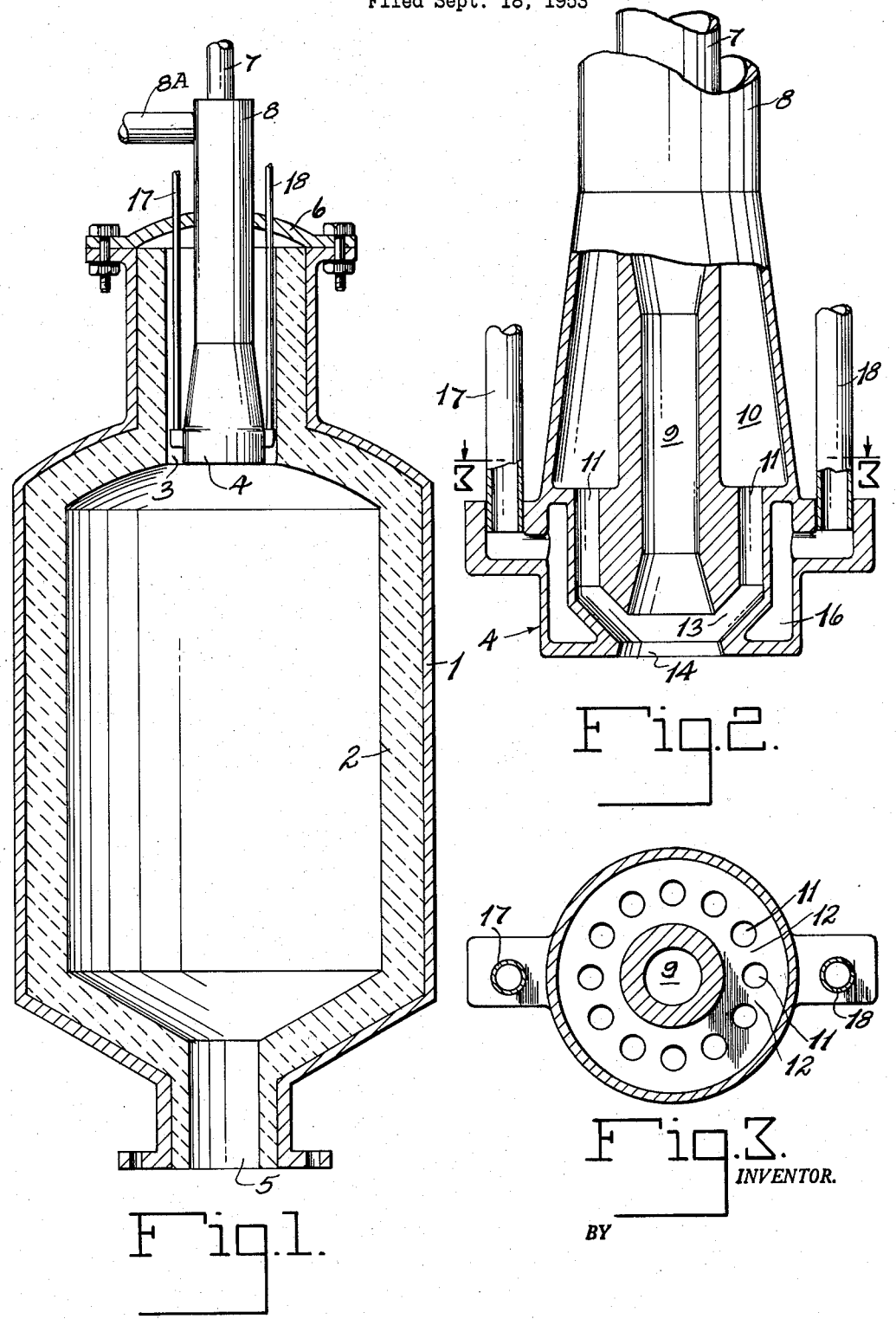

2,838,105

BURNER FOR THE PRODUCTION OF CARBON MONOXIDE AND HYDROGEN du Bois Eastman, Whittier, Calif., and Leon P. Gaucher, Tuckahoe, N. Y., assignors to The Texas Company, New York, N. Y., a corporation of Delaware Application September 18, 1953, Serial No. 380,898

3 Claims. (Cl. 158—109)

This invention relates to an apparatus for the partial combustion of a gasiform hydrocarbon to produce carbon monoxide and hydrogen. This invention is particularly applicable to the partial combustion of a hydrocarbon with oxygen enriched air or with substantially pure oxygen to produce carbon monoxide and hydrogen. In one of its more specific aspects, this invention relates to apparatus particularly suited for the partial combustion of fuel gas of high heating value, for example, natural gas, with substantially pure oxygen.

Gas mixtures consisting essentially of carbon monoxide and hydrogen are commercially important as a source of hydrogen for hydrogenation reactions and as a source of feed gas for the synthesis of hydrocarbons, oxygenated organic compounds or ammonia. A great deal of interest is shown at the present time in the production of carbon monoxide and hydrogen by the partial combustion of a hydrocarbon with oxygen-rich gas.

The production of carbon monoxide and hydrogen by the partial combustion of a hydrocarbon with a gas rich in free oxygen is disclosed in our U. S. Patent 2,582,938. As disclosed in said patent, the reaction is conducted at a temperature within the range of 2000 to 3000° F., preferably 2200 to 2800° F., in a compact, unpacked reaction zone. The reaction may be carried out at atmospheric pressure or at an elevated pressure up to 500 p. s. i. g. or higher. A pressure within the range of 100 to 300 p. s. i. g. is often preferred. Substantially pure oxygen and oxygen-enriched air containing in excess of 40 percent oxygen by volume are preferred. The reaction is exothermic; sufficient oxygen is supplied to the reaction zone to autogenously maintain the reaction temperature. To obtain maximum yields of carbon monoxide and hydrogen, it is desirable to conduct the reaction in a well insulated reactor and to preheat the reactants. The hydrocarbon is preferably heated to a temperature above about 600° F., and may be heated to a temperature of 1200° F. or higher. Preferably, the oxygen-containing gas is heated to a temperature above about 400° F. In practice, the quantity of oxygen required is in excess of the amount theoretically required for conversion of all the carbon in the feed to carbon monoxide, but substantially less than the amount theoretically required for conversion of all of the carbon in the feed to carbon dioxide. Generally, from about 5 to about 40 percent more oxygen is required than the theoretical for conversion of all of the carbon in the feed to carbon monoxide. The product gas consists essentially of carbon monoxide and hydrogen. The hydrocarbon content of the product gas is less than 5 mol percent and generally less than 0.5 mol percent. The gas is suitable as a source of hydrogen for hydrogenation or ammonia synthesis, for example, or as a source of feed gas for the synthesis of hydrocarbons or alcohols.

The partial combustion of a hydrocarbon fuel with oxygen-enriched air or with relatively pure oxygen to produce carbon monoxide and hydrogen presents unparalleled problems not usually encountered in the burner art. In the first place, it is essential to obtain very rapid and complete mixing of the reactants. In the second place, the burner must be so constructed that the reaction between the hydrocarbon and oxygen takes place entirely outside the burner proper and within a suitable reaction zone.

This reaction also presents problems in protection of the burner from overheating and from direct oxidation. Due to the reactivity of oxygen with those metals from which a suitable burner may be fabricated, it is very important to prevent the burner elements from attaining a temperature at which rapid oxidation of the metal occurs. The burner elements are subjected to heating by radiation from the reaction zone, even though the reaction takes place beyond the point of discharge from the burner. In addition, there is a tendency for eddy currents to form localized concentrations of highly combustible mixtures at the point of juncture of the hydrocarbon and oxygen ports of the burner. Eddy current mixtures of the two gases burn on the exposed metal surface of the burner. The burner surfaces where these combustible mixtures form often act as flame holders; combustion along the surface soon causes overheating and failure of the burner element by burning away of the metal by the oxygen.

Another problem peculiar to this reaction is the tendency for free carbon to form either on the burner or within the reaction space due principally to inadequate mixing of the gases. Formation of carbon on the surface of the burner often leads to burner failure, since it interferes with the mixing of the gases and causes localized concentrations of oxygen which overheat burner elements or associated refractory.

With conventional burners it has been found that it is necessary to use a quantity of oxygen in excess of the theoretical to prevent carbon formation. This aggravates the problem of protecting the burner from overheating and from oxidation and often causes undesirably high reaction temperatures. Steam is sometimes used to control the reaction temperature and retain it at a reasonable level. The problem is further aggravated by the fact that in the partial combustion of gases it is desirable to charge the reactant gases to the burner in a highly preheated state to reduce the oxygen requirements and give a maximum yield of the desired product gas.

In the generation of carbon monoxide and hydrogen from natural gas and relatively pure oxygen for the synthesis of hydrocarbons in commercial quantities, it has been found that conventional burners are unsatisfactory for one or more reasons given above. These burners generally are characterized by failure of burner elements, particularly by burning away of metal at the burner tips even where these elements have been water cooled.

The present invention relates to a burner in which the reactants are mixed at the point of discharge from the burner. In one of its more specific aspects, it relates to a burner of the annulus type, that is, a burner in which separate streams of reactant gases are introduced into a gas generator through concentric ports, one of the gases being discharged from a central port, and the other, from an annular port. The burner insures very rapid and intimate mixing of the reactant gases as they are discharged from the burner and protects the surfaces in contact with oxygen from attack by the oxygen. It also provides cooling of the reactants adjacent the burner elements, e. g., along the surface of an element. In addition, provision is made for removing heat from the metal surrounding both the central port and the annular port.

An object of this invention is to provide a burner or mixer for the partial combustion of fuel gases with gases rich in oxygen, for example, oxygen enriched air or relatively pure oxygen, to produce carbon monoxide and hydrogen.

Still another object of this invention is to provide an annulus-type burner which is relatively simple in construction, which insures adequate mixing of the reactant gases, and which is provided in novel manner with protection against overheating and reaction of burner elements with oxygen.

A further object of this invention is to provide a burner assembly of the annulus type in which provision is made for cooling the metal surrounding the central port and the annular port by heat transfer to a cooling fluid.

Fig. 1 of the drawings is a longitudinal cross-sectional view through a suitable reactor, illustrating the burner in operative position.

Fig. 2 is a longitudinal cross-sectional view through the body of the burner showing details of its construction.

Fig. 3 is a cross-sectional view of the burner taken along the plane 3—3 of Fig. 2.

With reference to Fig. 1, the reactor comprises a cylindrical pressure vessel 1 provided with refractory lining 2. At one end of the vessel, and along the axis thereof, is an inlet 3 into which is inserted a burner 4. An outlet 5 for reaction products is provided at the opposite end of the vessel. The piping associated with the burner extends through a removable closure 6 which permits access to the burner.

With reference to Figs. 2 and 3, the burner 4 is substantially cylindrical in shape. Gases are supplied to the burner through concentric pipes 7 and 8. The inner pipe 7 discharges a stream of gas through a discharge port at the end of central conduit 9 extending along the axis of the burner. The other gas is introduced through the annular space between pipes 7 and 8 into an annular manifold 10 surrounding conduit 9. From the annular manifold 10, the gas passes through a plurality of parallel ducts 11 in the burner body arranged annularly about conduit 9. Between the ducts 11 are a number of metal webs or bridges 12. From ducts 11, the gas discharges into a second annular manifold 13, from which it is discharged through an orifice 14 positioned beyond the discharge end of conduit 9. Manifold 13 converges toward the discharge orifice directing the stream of gas fed to the burner through pipe 8A into the stream of gas fed through pipe 9 at the point of discharge of the gases from the burner.

The series of webs 12 separated by symmetrically spaced holes 11 formed within the burner body adjacent the points of discharge of the gas streams provide paths for conducting heat from the metal of conduit 9 to an annular cooling jacket 16 surrounding the ring of ducts 11. A stream of cooling liquid is introduced to the cooling jacket through pipe 17 and discharged therefrom through pipe 18. Baffles, not illustrated, may be provided to insure good distribution of flow of the cooling liquid through the cooling jacket. The cooling liquid, suitably water, is preferably circulated through the cooling jacket 16 at relatively high velocity, preferably at least 20 feet per second. This prevents the formation of steam pockets which would tend to blanket a section of the tip and permit overheating. Transfer of heat through webs 12 cools the metal of the inner conduit effectively protecting it against overheating.

Another important feature of the burner of this invention is that the discharge end of the inner conduit 9 is flared from a point at least one diameter from the end of the conduit. The cross-sectional area of the gas stream flowing through conduit 9 is at least doubled at the point of discharge from the flared section of the conduit as compared with its cross-sectional area in the cylindrical portion of conduit 9. The included angle of the flared section of the conduit is not greater than approximately 45° and not less than approximately 14°, suitably about 20 to 35°. This holds the inner stream in solid contact with the metal wall out to the junction with the outer stream, which is solidly in contact with the external surface, eliminating dead spots from the resulting gas stream and preventing the formation of eddies.

The annular stream converges into the central stream at an angle within the range of 30 to 75° from the axis of the central stream, preferably at an angle of about 45° to 60°.

The discharge end of conduit 9 terminates in a knife edge formed by the junction of the flare in the interior of conduit 9, and the converging annular manifold 13.

Orifice 14 is positioned beyond the end of conduit 9 and is slightly larger than the terminus of the flared section of conduit 9. Orifice 14 is concentric with conduit 9 and in register with the discharge end of conduit 9. Preferably orifice 14 has a diameter equal to the base diameter of a cone, the base of which coincides with the external surface of the burner at orifice 14 and the surface of which coincides with the flared section of conduit 9. Orifice 14 may be faced as illustrated in the drawing to coincide with an imaginary extension of the flared section of conduit 9.

The gas stream from conduit 9 is preferably discharged through its discharge port at velocities in excess of about 100 feet per second. The velocity of the gas stream within manifold 13 at the point of juncture with the stream from conduit 9 is preferably in excess of about 100 feet per second.

Obviously, many modifications and variations of the invention, as hereinbefore set forth, may be made without departing from the spirit and scope thereof, and therefore, only such limitations should be imposed as are indicated in the appended claims.

We claim:

1. A burner structure for discharging and mixing a stream of gasiform hydrocarbon and a stream of oxygen containing gas which comprises a unitary body provided with an inner conduit having a relatively extended, substantially cylindrical portion adjacent its discharge end for unrestricted flow of one of the streams therethrough and a section at said discharge end joined to said cylindrical portion and flared outwardly starting within said inner conduit from a point at least one diameter thereof from said discharge end and terminating in a knife edge to define a circular discharge port, an outer conduit substantially concentric with and disposed about said inner conduit in spaced relationship thereto for the passage of the other of the streams therethrough, the discharge end of said outer conduit converging inwardly and terminating in a circular discharge orifice beyond said discharge port and in axial alignment therewith, whereby the streams from the inner and outer conduits are mixed with one another and discharged through said discharge orifice, and means disposed about the exterior of said burner structure adjacent said discharge orifice for cooling the discharge end of said burner structure, the angle of the outward flare of said section at said discharge end of said inner conduit being not less than 14° and not more than 45°, and the angle of inward convergence of said discharge end of said outer conduit being within the range of 30° to 75° measured from the longitudinal axis of said inner conduit.

2. A burner structure for discharging a reactant mixture of a stream of gasiform hydrocarbon and a stream of oxygen enriched air which comprises a body member provided with a central conduit for the passage of one of the streams, said central conduit having a cylindrical body cross section and a section outwardly flared at its discharge end for a distance of at least one diameter thereof and terminating in a knife edge at a circular discharge port, an outer conduit for the passage of the other stream supported concentrically in spaced relationship to said central conduit by a series of webs adjacent said discharge end thereof and thereby defining an annular array of ducts disposed about said central conduit and leading to a common annular manifold converging inwardly and ending as a discharge orifice spaced downstream from said discharge port and in register therewith whereby the streams from said central conduit and from said manifold are mixed with one another and discharged through said orifice, and a passageway for cooling fluid in said body member surrounding said annular array of ducts and said manifold whereby said discharge end of said central conduit is cooled by means of heat transfer via said series of webs to said cooling fluid, said discharge orifice having a diameter equal to the base diameter of a cone whose base coincides with the external surface of said burner structure at said orifice and the conical surface of which coincides with the outwardly flared section of said central conduit.

3. A burner structure as defined in claim 2 wherein the angle of the outwardly flared section at said discharge end of said central conduit is not less than 14° and not more than 45°, and the angle of convergence of said manifold measured from the longitudinal axis of said central conduit is within the range of 30° to 75°.

References Cited in the file of this patent

UNITED STATES PATENTS

| | | |
|---|---|---|
| 2,397,349 | Hartung | Mar. 26, 1946 |
| 2,515,158 | Twipin et al. | July 11, 1950 |
| 2,532,711 | Goddard | Dec. 5, 1950 |
| 2,582,938 | Eastman et al. | Jan. 15, 1952 |

FOREIGN PATENTS

| | | |
|---|---|---|
| 332,063 | Great Britain | July 17, 1930 |
| 673,670 | Germany | Mar. 25, 1939 |